United States Patent
Gellender

[15] 3,653,718
[45] Apr. 4, 1972

[54] MULTIPLE SECTION PNEUMATIC TIRE

[72] Inventor: Carl Gellender, 2885 West 12th, Brooklyn, N.Y. 11224

[22] Filed: Aug. 17, 1970

[21] Appl. No.: 64,290

[52] U.S. Cl. ............................................301/38 R, 152/334
[51] Int. Cl. ....................................B60b 19/00, B60b 25/02
[58] Field of Search..................152/331, 333, 334, 335, 414; 301/38 R

[56] References Cited

UNITED STATES PATENTS

| | | | |
|---|---|---|---|
| 3,567,287 | 3/1971 | Nutter | 301/38 R |
| 1,177,549 | 3/1916 | Stewart | 152/334 |
| 3,106,951 | 10/1963 | Hurdel | 152/334 |

FOREIGN PATENTS OR APPLICATIONS

| | | | |
|---|---|---|---|
| 565,892 | 12/1944 | Great Britain | 301/38 R |
| 1,504,043 | 12/1967 | France | 152/334 |
| 794,345 | 4/1958 | Great Britain | 301/38 R |

Primary Examiner—Arthur L. La Point
Assistant Examiner—Robert Saifer
Attorney—Stoll and Stoll

[57] ABSTRACT

A tire and wheel combination made with a plurality of independent tire and wheel sections for individual mounting on and demounting from a vehicle. Each tire section has its own air chamber and each wheel section is independently mountable on the vehicle. Each tire section is joined to its wheel section. Adjoining sections butt smoothly to each other. Wheels may have a larger radius at the places where sections join and a smaller radius intermediate such places. Angles of intersection may be either perpendicular to the plane of the tire or, preferably, at opposed angles with respect thereto.

3 Claims, 6 Drawing Figures

PATENTED APR 4 1972 3,653,718

INVENTOR.
CARL GELLENDER
BY Stoll and Stoll
ATTORNEYS

MULTIPLE SECTION PNEUMATIC TIRE

BACKGROUND OF THE INVENTION

The invention arises from the difficulty which conventional pneumatic tires present when they must be changed under less than ideal conditions as, for example, may be occasioned by a flat tire or a blowout. In conventional tires the wheel and tire must be jacked off the ground in order to permit removal from the vehicle. Although there are many improvements in jacking systems, there is no avoiding the fact that some jacking function must be performed.

SUMMARY OF THE INVENTION

The present invention provides a novel pneumatic tire and wheel combination by which it is possible to remove damaged and unusable sections of a tire without the necessity for any jacking function however performed.

Briefly, and not by way of limitation, the present invention provides a tire and wheel combination made in individually removable sections. Each section has its own independent air chamber. In the event of a flat or other rupture of one of the chambers, it is only necessary to move the vehicle until the damaged section is at the top of the wheel. That section alone is removed and a replacement section inserted. There being no weight supported by that section, no jacking is necessary.

To help avoid severe vertical movement from an inflated section to a deflated section while the vehicle is in motion and the tire turning, the invention provides a wheel having a large radius at the portion where adjoining sections abut and a small radius intermediate the ends of each section. For the same reason and for additional reasons, the present invention also provides that the angle of intersection need not be perpendicular to the plane of the tire but may be at an angle which is non-perpendicular with respect to that plane. In particular, the ends of each section are cut at opposed angles with respect to the plane of the tire and wheel.

BRIEF DESCRIPTION OF THE DRAWING

FIG. 4 shows such a wheel and tire combination for a three section configuration and FIG. 5 shows the same for a two section configuration.

DESCRIPTION OF PREFERRED EMBODIMENTS OF THE INVENTION

Figure 1:
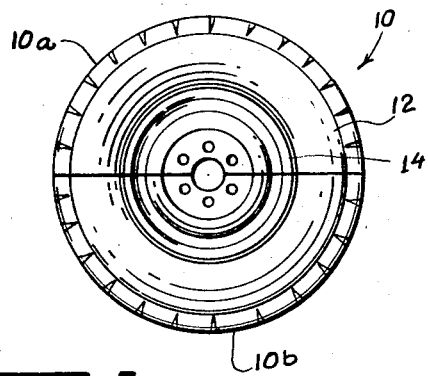
FIG. 1 is a plan view of a tire and wheel combination in accordance with the present invention wherein two sections are provided.
Figure 2:
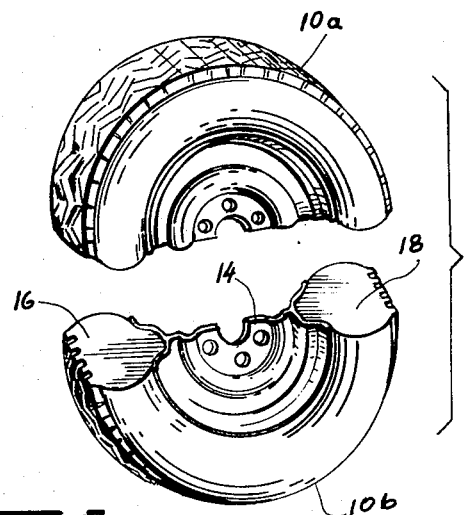
FIG. 2 is a perspective exploded view of the tire and wheel combination of FIG. 1 wherein the abutting portions of one section may clearly be seen.
Figure 3:
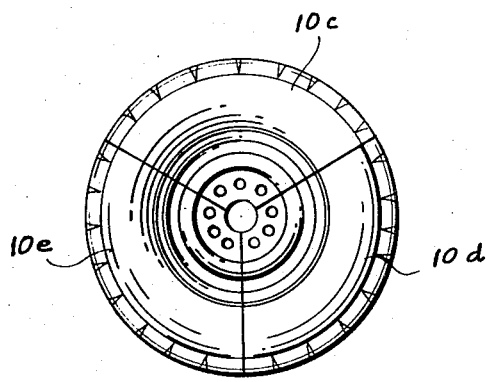
FIG. 3 is a view similar to that of FIG. 1 but showing a tire and wheel combination having three sections.

Referring to the drawing, the multi-section pneumatic tire and wheel 10 of the present invention is provided with an outer tire 12 and an inner wheel 14 firmly joined thereto. The tire and wheel combination is provided in a plurality of individually removable sections, each section being a sector of a circle having a tire portion and a wheel portion. In a first embodiment, there are two such sections 10a and 10b as may be seen in FIGS. 1 and 2. It may be desirable, particularly in connection with heavy load-bearing applications, to provide more than two sections and FIG. 3 shows a tire and wheel combination having three sections, 10c, 10d and 10e. More sections are entirely feasible.

Each section is provided with an individual air chamber within each tire portion 12 and with support and mounting provision by means of an individual wheel portion 14. To provide retention of air, the end surfaces 16 and 18 of each tire section are closed as, for example, by a rubber cap formed integrally with the tire. Such caps should be airtight and extend to seal against wheel 14. End sections 16 and 18 should be smooth and uniformly made so as to butt smoothly against similar end surfaces of adjoining sections.

It is important that each tire portion be adequately secured to its wheel portion and the wheel portion in turn be adapted for secure fastening to the vehicle. The tire may be vulcanized, riveted or otherwise joined to the wheel portion and the wheel portion may be provided with sufficient bolt mounting holes to provide adequate fastening surface to the brake drum, disc or other mounting plate on the vehicle.

Separate sections of a given tire should be uniform and interchangeable. It is this feature which permits proper functioning of the invention. If one section becomes deflated or damaged to the extent to which it is no longer usable, the vehicle is moved until an undamaged section is at the bottom and supports the weight of the car on the road surface. The damaged section would then be at the top and under no vehicle weight load. It may be removed from the vehicle by merely unbolting that section without disturbing the load-bearing section and a replacement section, identical to the undamaged section, may be placed in its stead. No jacking is required and very little time is expended in replacing the damaged section. Moreover, less spare tire space is consumed in the trunk of the vehicle because it would reasonably be necessary to carry only one section rather than an entire tire and wheel combination.

Figure 4:
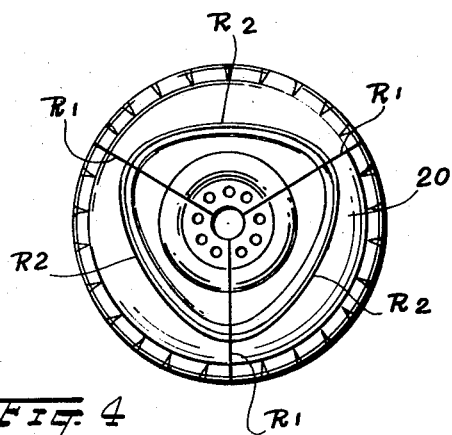
FIGS. 4 and 5 show wheel and tire combinations made in accordance with another aspect of the invention, wherein the outer edge of the wheel is non-circular.
Figure 5:
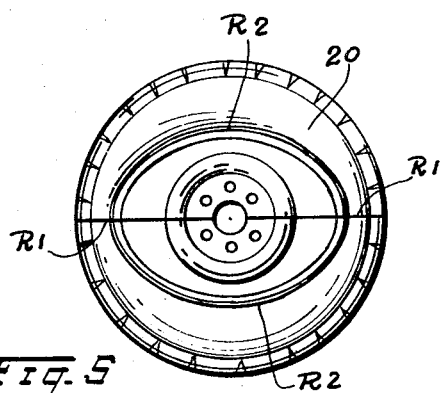

It is recognized that a sudden loss of air pressure in one section while the vehicle is travelling will result in deflated and inflated sections being alternately presented to the road surface; severe vertical motion of the tire and wheel combination might then result. Provision is made to reduce this tendency by means of a wheel which has a non-circular outer rim 20. Outer rim 20 describes a smooth curve having a larger radius at the end of each section, a smaller radius intermediate the ends of each section and uniform graduation of radii between the ends and the center of each section. For a given tire and wheel combination all major radii and all minor radii should be identical. Thus, in the two section tire and wheel combination shown in FIG. 5, rim 20 is provided with major radii at R1 and minor radii at R2 forming an ellipse. In the three section tire and wheel combination shown in FIG. 4, the major radii are shown also at R1 and the minor radii also at R2. The inner portion of the wheel receiving the brake drum or other mounting plate and having the bolt pattern should, of course, remain uniformly circular.

The result of this provision of the invention is that as the wheel rotates from an inflated section to a deflated section (or from a deflated section to an inflated section) there is far less vertical motion of the wheel and tire because the wheel rim is closer to the outer surface of the tire and provides more uniform support than if the rim at that portion had a lesser radius. The full ability of the tire to compress for cushioning effect is provided at the portion of the wheel having small radius R2.

A further provision of the present invention is the angle at which the end surfaces 16 and 18 of each section are disposed with respect to the plane of the tire and wheel combination. It will be seen in the embodiment shown, for example, in FIGS. 1 and 2, that the end sections are perpendicular to the plane of the tire and wheel combination and that removal of one section may be achieved by moving that section perpendicular to its plane; that is along the axis about which the tire and wheel combination rotates. It will be appreciated that this may be impossible when a vehicle fender is in the way. Accordingly, the present invention provides that each end portion may be at a non-perpendicular angle with respect to the plane of the tire and wheel. Moreover, the present invention provides that the ends of each section may be at opposite but equal nonperpendicular angles with respect to the plane of the tire and wheel combination. By reason of such a feature, a damaged section may be removed by rotating it downwardly and away from the undamaged section thus clearing any fender obstruction.

Figure 6:
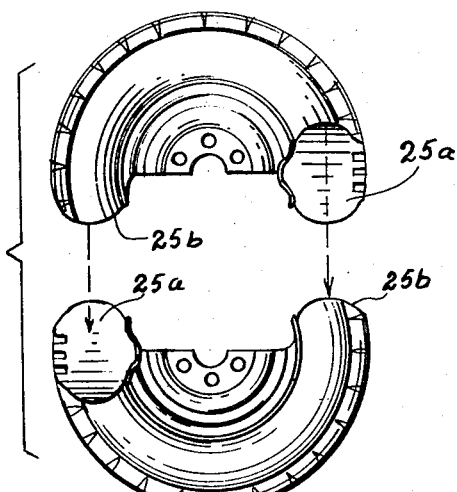
FIG. 6 is an exploded plan view of a tire and wheel combination showing a further aspect of the invention wherein it may be seen that the angle at which each section terminates is not perpendicular to the plane of the tire and wheel but is at an angle with respect thereto. Opposite ends of each section are at opposed angles and are not parallel to each other.

This feature is clearly shown in FIG. 6 wherein end caps 25a face diagonally downwardly and end caps 25b face diagonally upwardly. End caps 25a are accordingly visible in the figure and end caps 25b are not.

With identical sections it is important that identical air pressure be maintained in all sections. This may be accomplished by having valve stems from each section join to a single stem and therefore be filled simultaneously from a single air pressure source. Should the sections not be entirely identical as, for example, when a worn section having a slightly smaller outside radius is joined to a new section having a slightly larger outside radius, it might be desirable to have slightly greater air pressure in the worn section to compensate for the different radii.

While the foregoing is illustrative of preferred embodiments of the invention, it is clear that other embodiments may be had in accordance with the teachings hereof. For example, the tire and wheel combination could be manufactured as an extremely thin sectioned disc for auxiliary mounting on a vehicle having a conventional non-sectioned tire. In the event of a damaged conventional tire, it is only necessary to mount the sectioned auxiliary tire in order to provide temporary transportation to a service station. Because the auxiliary tire is mounted section by section, it is not necessary to jack up the car. A first section is mounted at the top of the standard wheel, the vehicle is moved forward until that section is at the bottom and supporting the weight of the car and then the remaining sections of the auxiliary tire are mounted.

What is claimed is:

1. A tire and wheel combination comprising:
  a. a plurality of sections, each section being substantially a sector of a circle and each comprising a portion of the tire and a portion of the wheel, the tire being secured to the wheel at a rim;
  b. said tire portion having end caps to provide a chamber therewithin;
  c. said rim being non-circular.
2. A tire and wheel combination in accordance with claim 1, wherein:
  said rim describes a smooth curve having a larger radius at the ends of each said section and a smaller radius intermediate said ends.
3. A tire and wheel combination comprising:
  a. a plurality of sections, each section being substantially a sector of a circle and each comprising a portion of the tire and a portion of the wheel, the tire being secured to the wheel;
  b. said tire portion having end caps to provide a chamber therewithin;
  c. said tire end caps being disposed non-perpendicular to the plane of the tire and wheel;
  d. said end caps of each section being oppositely disposed at equal angles with respect to the plane of the tire and wheel.

* * * * *